(12) United States Patent  (10) Patent No.: US 7,425,776 B2
Ketcham  (45) Date of Patent: Sep. 16, 2008

(54) MULTI-CYLINDER WIND POWERED GENERATOR

(76) Inventor: John C. Ketcham, 4 White Oak, Elon, NC (US) 27244

( * ) Notice: Subject to any disclaimer, the term of this patent is extended or adjusted under 35 U.S.C. 154(b) by 44 days.

(21) Appl. No.: 11/471,418

(22) Filed: Jun. 21, 2006

(65) Prior Publication Data
US 2007/0296217 A1    Dec. 27, 2007

(51) Int. Cl.
F03D 9/00 (2006.01)
H02P 9/04 (2006.01)

(52) U.S. Cl. .......................................... 290/55; 290/44
(58) Field of Classification Search .................. 290/55, 290/44
See application file for complete search history.

(56) References Cited

U.S. PATENT DOCUMENTS

| | | | | |
|---|---|---|---|---|
| 4,039,849 A | * | 8/1977 | Mater et al. | 290/55 |
| 4,113,408 A | * | 9/1978 | Wurtz et al. | 416/17 |
| 4,115,027 A | * | 9/1978 | Thomas | 415/53.1 |
| 4,237,384 A | * | 12/1980 | Kennon | 290/55 |
| 4,303,835 A | * | 12/1981 | Bair | 290/55 |
| 4,321,476 A | * | 3/1982 | Buels | 290/55 |
| 4,406,584 A | * | 9/1983 | Stepp | 416/41 |
| 4,430,044 A | * | 2/1984 | Liljegren | 416/119 |
| 4,449,053 A | * | 5/1984 | Kutcher | 290/44 |
| 4,456,429 A | * | 6/1984 | Kelland | 416/117 |
| 4,474,529 A | * | 10/1984 | Kinsey | 415/4.2 |
| 4,537,559 A | * | 8/1985 | Herrmann | 416/119 |
| 4,551,631 A | * | 11/1985 | Trigilio | 290/55 |
| 4,613,282 A | * | 9/1986 | Wood | 416/36 |
| 4,659,284 A | * | 4/1987 | Wood | 416/36 |
| 4,664,596 A | * | 5/1987 | Wood | 416/32 |
| 4,684,817 A | * | 8/1987 | Goldwater | 290/55 |
| 4,715,776 A | * | 12/1987 | Benesh | 415/4.1 |
| 4,718,822 A | * | 1/1988 | Riezinstein | 416/119 |
| 4,784,568 A | * | 11/1988 | Benesh | 415/4.2 |
| 4,838,757 A | * | 6/1989 | Benesh | 415/4.4 |
| 4,857,753 A | * | 8/1989 | Mewburn-Crook et al. | 290/55 |
| 5,009,569 A | * | 4/1991 | Hector et al. | 415/4.1 |
| 5,038,049 A | * | 8/1991 | Kato | 290/55 |
| 5,057,696 A | * | 10/1991 | Thomas | 290/44 |

(Continued)

FOREIGN PATENT DOCUMENTS

JP    2002081364 A    *    3/2002

(Continued)

*Primary Examiner*—Darren Schuberg
*Assistant Examiner*—Pedro J Cuevas

(57) ABSTRACT

A multiple generator having a vertical post and multiple vertical tubes has the generators positioned vertically one above the other. Each is cylindrical in shape and has two rings separated by connecting fins. The cylinders vary in size with the top being the smallest, the middle or second being larger and the third being the largest. With low winds, only the smallest generator turns. As wind velocity increases, the small generator rotates faster until clutches in a clutch ring move outwardly until they engage and secure to the second generator so both generators move together. As wind speed increases, clutches on the second generator move outwardly until they engage and secure to the third generator and all generators now rotate together. Thus varying amounts of electricity are generated depending on the wind speed and which generators are active. Each generator has its own rotating shaft with ball bearings between the post and first tube and between the first and second tubes. A cage protects the device from birds or other air-suspended articles.

19 Claims, 4 Drawing Sheets

U.S. PATENT DOCUMENTS

| | | | | |
|---|---|---|---|---|
| 5,332,925 A * | 7/1994 | Thomas | | 290/44 |
| 5,664,418 A * | 9/1997 | Walters | | 60/398 |
| 6,097,104 A * | 8/2000 | Russell | | 290/54 |
| 6,132,172 A * | 10/2000 | Li | | 416/11 |
| 6,172,429 B1 * | 1/2001 | Russell | | 290/54 |
| 6,417,578 B1 * | 7/2002 | Chapman et al. | | 290/44 |
| 6,518,680 B2 * | 2/2003 | McDavid, Jr. | | 290/54 |
| 6,638,005 B2 * | 10/2003 | Holter et al. | | 415/4.2 |
| 6,655,907 B2 * | 12/2003 | Brock et al. | | 415/4.2 |
| 6,674,181 B2 * | 1/2004 | Harbison | | 290/55 |
| 6,710,469 B2 * | 3/2004 | McDavid, Jr. | | 290/55 |
| 6,734,576 B2 * | 5/2004 | Pacheco | | 290/55 |
| 6,800,955 B2 * | 10/2004 | McDavid, Jr. | | 290/54 |
| 6,910,873 B2 * | 6/2005 | Kaliski | | 418/267 |
| 6,960,062 B2 * | 11/2005 | Blank et al. | | 415/175 |
| 7,215,037 B2 * | 5/2007 | Scalzi | | 290/55 |
| 7,220,107 B2 * | 5/2007 | Kaneda | | 416/186 A |
| 7,230,348 B2 * | 6/2007 | Poole | | 290/55 |
| 7,319,279 B2 * | 1/2008 | Korner | | 290/55 |
| 7,329,965 B2 * | 2/2008 | Roberts et al. | | 290/55 |
| 2003/0122380 A1 * | 7/2003 | Harbison | | 290/55 |
| 2003/0133782 A1 * | 7/2003 | Holter et al. | | 415/4.2 |
| 2003/0133783 A1 * | 7/2003 | Brock et al. | | 415/4.2 |
| 2003/0175109 A1 * | 9/2003 | Brock et al. | | 415/4.2 |
| 2003/0201645 A1 * | 10/2003 | Pacheco | | 290/54 |
| 2004/0105754 A1 * | 6/2004 | Takahashi | | 415/4.4 |
| 2004/0265116 A1 * | 12/2004 | Kaneda | | 415/4.2 |
| 2005/0042095 A1 * | 2/2005 | Kaliski | | 416/88 |
| 2008/0106102 A1 * | 5/2008 | Liao | | 290/55 |

FOREIGN PATENT DOCUMENTS

JP     2006307815 A * 11/2006

\* cited by examiner

MULTI-CYLINDER WIND POWERED GENERATOR

BACKGROUND OF THE INVENTION

1. Field of the Invention

The present invention relates to wind powered generators and, more particularly, to multi-cylinder vertically positioned wind powered generators having the ability to utilize low wind speeds to commence generating some electricity and to increasingly utilize higher wind speeds to substantially increase generating capacity.

2. Description of the Prior Art

Conventional wind powered generators in place today generally have three rotors with each being nearly as long as the wing of a small airplane. The rotors are heavy and require a fair amount of wind to get them moving. To capture the wind, the rotors are placed on very high towers. When they move, they do not appear to be going very fast because they are so big. However, they are going fast enough to create considerable noise in the form of a whomp, whomp, whomp. They are high enough and going fast enough to pose a danger to birds, and they do kill birds much to the dismay of environmentalists. They are additionally complicated in that the rotors must be properly positioned to catch the wind effectively. If there is a change in wind direction, the rotors must be repositioned. With a wind that is gusting from several different directions, there are inefficiencies.

Thus there is a need for a number of improvements in the conventional wind powered generator field, and it is to this need that the present invention is directed.

OBJECTIVES AND SUMMARY OF THE INVENTION

A primary objective of the present invention is to provide a wind generator having improved features facilitating convenient and efficient operation and design for utilizing wind power.

Another objective of the present invention is to provide a machine that can handle light air with a smaller cylinder but have additional cylinders of sufficient size and weight to handle heavier winds.

Yet another objective of the present invention to provide a device that does not need to be so high above the ground as is the case with conventional windmill fans.

Still another objective of the present invention is to provide a device that can receive air flow from any direction without requiring repositioning with a wind direction change.

Yet still another objective of the present invention is to provide a device which emits a whirling sound which is more restrained and more easily tolerated than conventional windmill sounds.

A further objective of the present invention is to provide a device that can be made more esthetically acceptable by being attractively lighted to enhance appearance and permit relatively easy location at night.

The invention is a multiple generator vertical post and multiple tube device powered by wind wherein the individual generators are positioned vertically, one above the other. Each is cylindrical in shape and designed similar to a squirrel cage fan. Two rings are separated by fins, and each cylinder is made of lightweight aluminum.

The top cylinder is the smallest in diameter and in length. At the bottom of the top cylinder is a clutch mechanism also in the form of a ring which extends below the level of the top ring of the second cylinder. As the top cylinder moves faster, centrifugal force pushes the arcs of the clutch ring out until they engage with the top ring of the second cylinder so that the top and middle cylinder begin to move together. As the second cylinder gathers speed, a second situation occurs. The second also has a clutch ring, and that ring engages the lower cylinder to rotate it.

Since the top cylinder is the lightest in weight, it will move with the lightest wind flow thereby generating some electricity. The second cylinder is larger and heavier than the first, and when it is moving, it will generate significantly more electricity. The lowest of the stacked cylinders is the largest and heaviest of the cylinders, and when it is moving, even larger amounts of electricity are generated. Once at this stage, all three cylinders are making a generating contribution.

The top cylinder is attached to the longest supporting and rotating member, a post, and at the bottom of that post is a gearing mechanism which turns a dynamo. On the outside of this post is a first tube to which the second cylinder is attached. It rotates independently of the post and also has a gearing mechanism at the bottom which turns a dynamo. A second tube is outside the first tube and attaches to the lowest cylinder. It operates similarly to the first sleeve. There are ball bearing rings between the post and the first tube for separation and sturdiness which allow the post and that tube to rotate with a minimum of friction. Similarly, there are ball bearing rings between the first tube and the second tube which accomplish the same result. Suspended over all three cylinders is a mesh cage whose purpose is to protect the cylinders from heavy hail and other adverse weather conditions and to prevent birds from crashing into the moving cylinders and sustaining injuries.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objectives of the invention set forth above, along with the various features of novelty, which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

The drawings are included to provide a further understanding of the invention and are incorporated in and constitute a part of this specification. They illustrate embodiments of the invention and, together with their description, serve to explain the principles of the invention.

DETAILED DESCRIPTION OF THE PREFERRED EMBODIMENT

Figure 1:
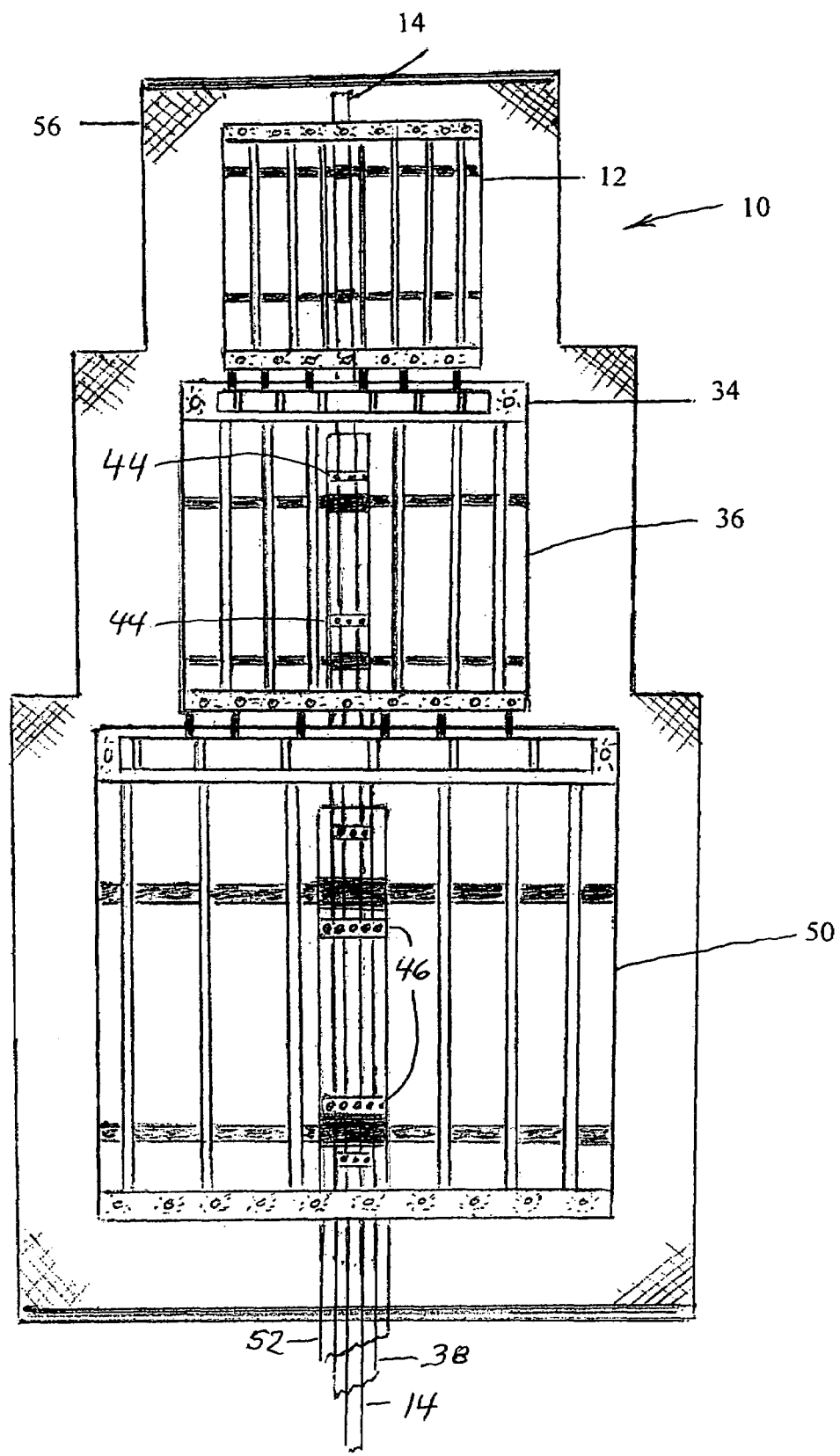
FIG. 1 is an elevational schematic view of the multi-cylinder wind powered generator of the present invention in this example having three cylinders.
Figure 2:
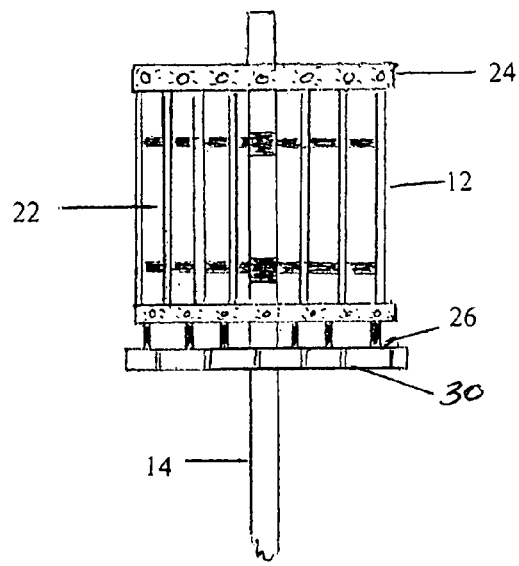
FIG. 2 is an elevational, isolated view of the first, top and lightest weight cylinder shown in FIG. 1.
Figure 3:
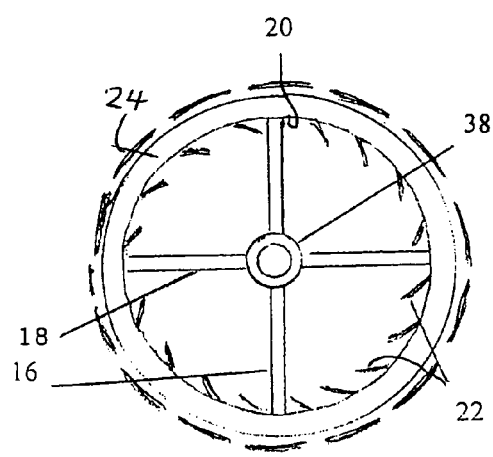
FIG. 3 is a top, plan view of the first cylinder shown in FIG. 2 illustrating the positioning of the wind-engaging fins.

Referring now to the drawings and particularly to FIG. 1, a generating device shown generally as 10 includes a first squirrel cage cylinder 12 which is attached to a post 14 by braces 16, 18 that extend to the inner perimeter 20 of cylinder 12. A plurality of fins 22 are secured to and between circular end rings 24, 26 in a fixed relationship.

Figure 4:
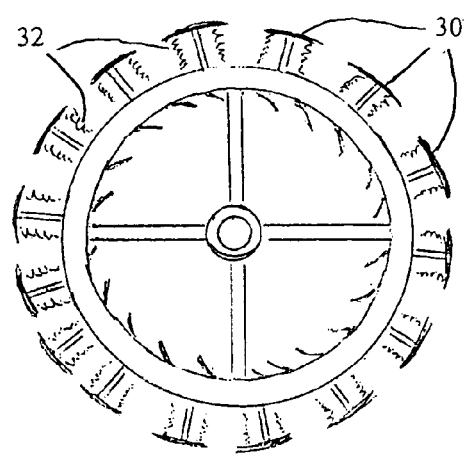
FIG. 4 is a top, plan view of the top cylinder as shown in FIGS. 1, 2 and 3 showing the clutch plates in the extended condition so as to engage the inside of the second, middle cylinder positioned below and cause that cylinder to rotate with the top cylinder.
Figure 5:
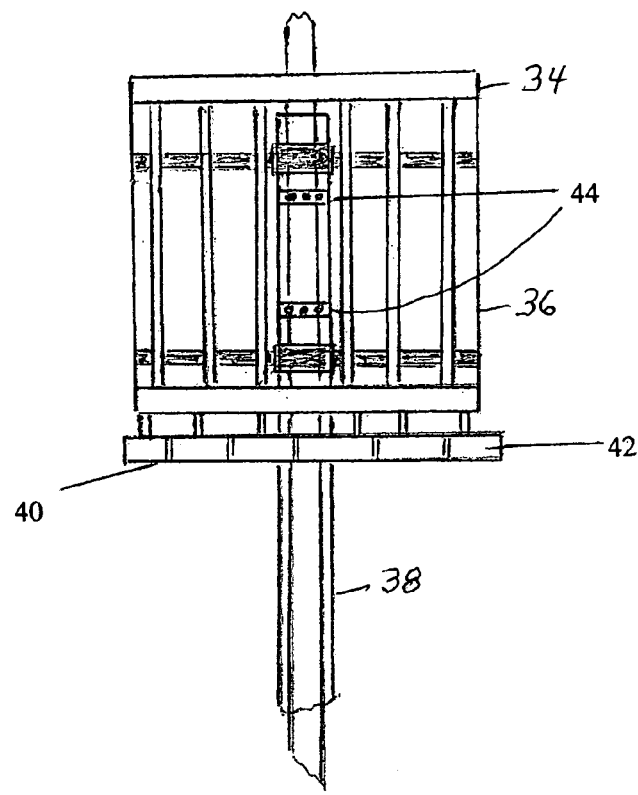
FIG. 5 is an elevational, isolated view of the second, and somewhat larger cylinder which is attached to a tube rather than the post to which the top cylinder is connected and is separated from the post by ball bearing rings.
Figure 6:
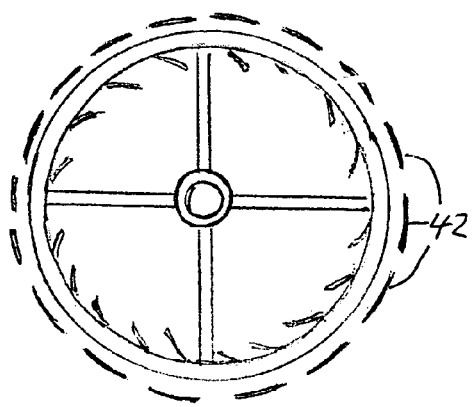
FIG. 6 is a top, plan view of the second cylinder shown in FIG. 5.
Figure 7:
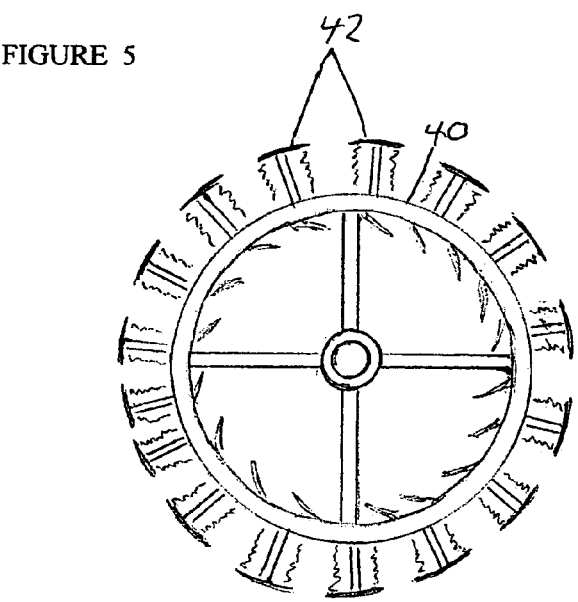
FIG. 7 is a top, plan view of the second cylinder showing the clutch plates in the extended condition so as to engage the inside of the third and largest cylinder positioned below and cause that cylinder to rotate with the second and first cylinders.
Figure 8:
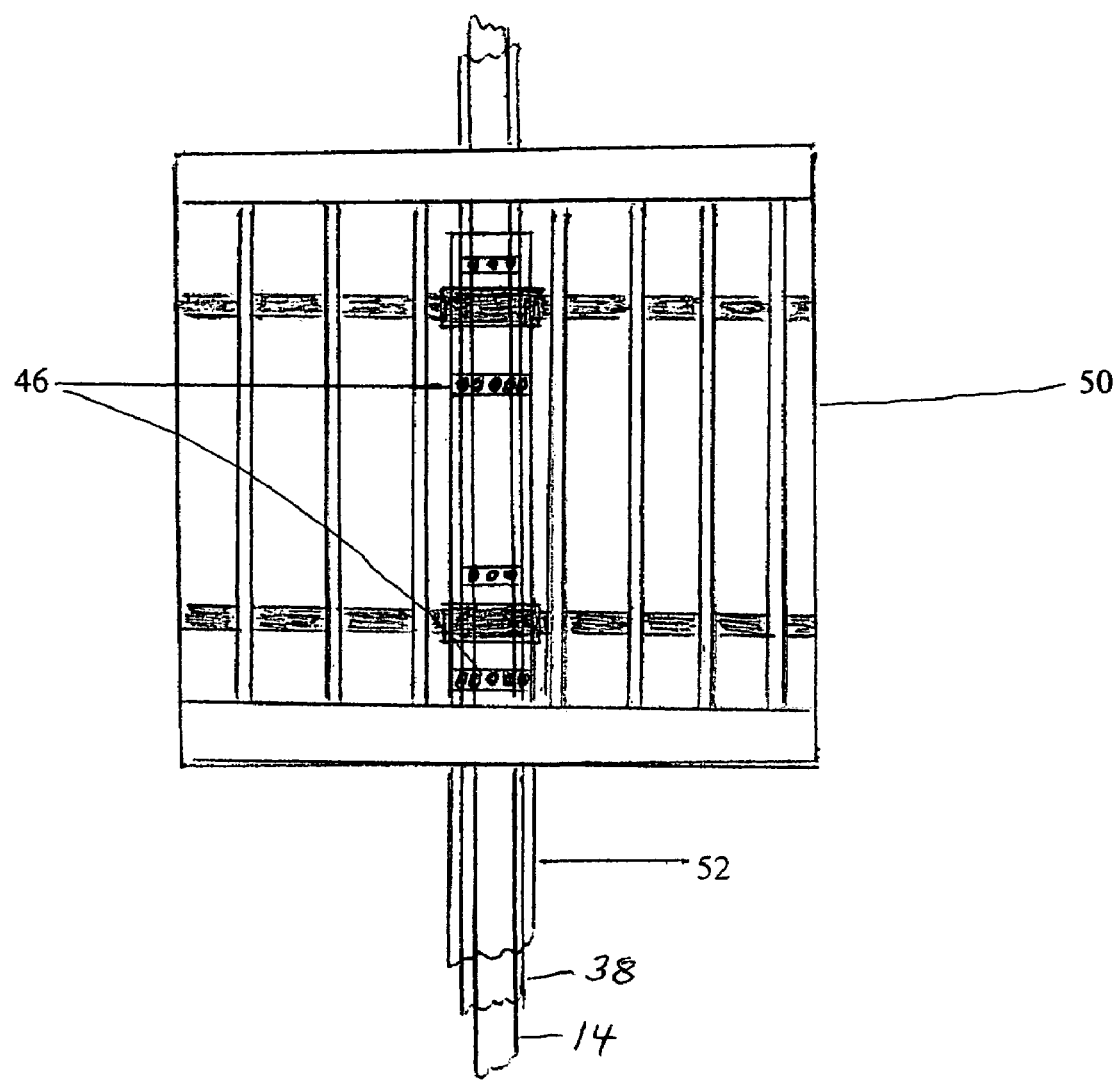
FIG. 8 is an elevational view of the third and largest cylinder which is attached to a second tube which is separated from the first tube by ball bearing rings.

Cylinder ring 26 supports clutch plates 30. When cylinder 12 is not rotating rapidly, retracting springs 32 hold plates 30 to ring 26, thus allowing ring 26 to fit freely inside the top ring 34 of second cylinder 36. As wind rotates cylinder 12 at a faster rate, centrifugal force pushes clutch plates 30 outwardly so that they engage the inner perimeter 35 of top ring 34 of second cylinder 36 and cause it to rotate. As wind decreases, clutch plates 30 retract and second cylinder 36 stops moving. FIG. 4 illustrates clutch plates 30 of cylinder 12 in the extended, rim-engaging position.

Second cylinder 36 is attached to a first tube 38. The attachment is similar to the attachment of top cylinder 12 to post 14. Second cylinder 36 also has a ring 40 with clutch plates 42 attached, and they function similarly to clutch plates 30 on top cylinder 12. To keep post 14 and first tube 38 separated and turning freely, two rings 44 are attached to post 14. They house a series of ball bearings that touch first tube 38 and keep it separated from post 14.

The third and largest cylinder 50 is attached to second tube 52 in the same manner as those previously described. Its only difference is that it does not have a ring of clutch plates because there is no cylinder below it to be turned. Ball bearings within rings of bearings 46 keep second tube 52 separated from first tube 38 and allow easy turning.

First cylinder 12 is attached to the longest supporting and rotating member, post 14, and at the bottom of post 14 is a conventional gearing mechanism which turns a dynamo (not shown). On the outside of post 14 is first tube 38 to which second cylinder 36 is attached. It rotates independently of post 14 and also has a connected conventional gearing mechanism and dynamo. Second tube 52 is outside first tube 38 and attaches to third cylinder 50. It operates similarly to first tube 38. There are ball bearings, more particularly, ball bearing rings 46 between post 14 and first tube 38 for separation and sturdiness which allow post 14 and first tube 38 to rotate with a minimum of friction. Similarly, there are ball bearings, more particularly, ball bearing rings 46 between first tube 38 and second tube 52 which accomplish the same result.

Suspended over cylinders 12, 36 and 50 is a covering 56 (FIG. 1) made of wire mesh or other suitable material whose purpose is to protect the cylinders from heavy hale or other adverse weather conditions and to prevent birds prevent birds from colliding with the moving cylinders and sustaining injuries.

From the preceding description, it can be seen that a multi-cylinder vertically positioned wind-powered generator system has been provided that will meet all of the advantages of prior art devices and offer additional advantages not heretofore achievable. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modifications and equivalents that full within the scope of the appended claims are deemed within the present inventive concept.

What is claimed is:

1. A wind driven generation device comprising: a pair of vertically positioned wind driven rotatable and electricity generating cylinders; each of said pair of cylinders having a different diameter, said cylinders each comprising a plurality of fixed fins, a first ring, said fins rigidly attached to said first ring, and means selectively connecting the cylinders to increase generating capacity in response to increased wind speed and to decrease generating capacity in response to decreased wind speed.

2. The device as claimed in claim 1 further comprising a third cylinder, said third cylinder having a diameter larger than each of said pair of cylinders, said third cylinder selectively connected to said pair of cyliners in response to the wind speed.

3. The device as claimed in claim 2 wherein the device responds to multi-directional wind flow without wind directional adjustment, each of the rotatable cylinders has a plurality of wind-receiving fins and each of the rotatable cylinders is connected to a single centrally positioned rotating member.

4. The device as claimed in claim 3 wherein each of the rotatable cylinders has circular ends to which the vertical wind-receiving fins are rigidly secured to prevent rotation of the fins in relation to the circular ends and a plurality of clutch plates normally held in a circular configuration around one circular end by the bias of a plurality of springs and moveable outwardly upon rotation of the cylinder to over come the bias of the springs and engage and secure the cylinder to a larger diameter cylinder so that the secured cylinders rotate together.

5. The device as claimed in claim 4 wherein all cylinders are connected and rotate together.

6. The device as claimed in claim 5 further comprising: a cage surrounding the device to provide protection from birds and other air-suspended articles.

7. The device as claimed in claim 4 further comprising: a cage surrounding the device to provide protection from birds and other air-suspended articles.

8. The device as claimed in claim 3 further comprising: a cage surrounding the device to provide protection from birds and other air-suspended articles.

9. The device as claimed in claim 2 wherein each of the rotatable cylinders has a circular interior opening with first and second interior opening ends and circular ends over the first and second interior opening ends to which the vertical wind-receiving fins are secured and a plurality of clutch plates normally held in a flat circular configuration proximate one of the circular ends and within one of the interior opening ends of an adjacent cylinder by the bias of a plurality of springs and movable outwardly upon rotation of the cylinder to overcome the bias of the springs and engage and secure the rotating cylinder to the surface of the inside of the circular interior opening of a larger diameter adjacent cylinder so that said cylinders rotate together.

10. The device as claimed in claim 9 wherein the device responds to multi-directional wind flow without wind directional adjustment, each of said, rotatable cylinders has a plurality of fixed vertical wind-receiving fins, each of said rotatable cylinders connected to a single centrally positioned rotating member.

11. The device as claimed in claim 10 further comprising: a cage surrounding the device to provide protection from birds and other air-suspended articles.

12. The device as claimed in claim 9 further comprising: a cage surrounding the device to provide protection from birds and other air-suspended articles.

13. The device as claimed in claim 2 further comprising: a plurality of clutch plates normally held in a circular configuration around at least one circular end by the bias of a plurality of springs and movable outwardly upon rotation of one of said cylinders to overcome the bias of the springs and engage and secure the cylinder to a larger diameter cylinder so that said cylinders rotate together.

14. The device as claimed in claim 13 wherein each of said rotatable cylinders is connected to a single centrally positioned rotating member.

15. The device as claimed in claim 2 further comprising: a cage surrounding the device to provide protection from birds and other air suspended articles.

16. The device as claimed in claim 2 wherein the device responds to multi-directional wind flow without wind directional adjustment.

17. The device as claimed in claim 2 wherein each of the rotatable cylinders has a plurality of vertical wind-receiving fins and a second ring, said fins fixably attached to said second ring.

18. The device as claimed in claim 2 wherein each of the rotatable cylinders is connected to a single centrally positioned rotating member.

19. The device as claimed in claim 1 wherein the device responds to multi-directional wind flow without wind directional adjustment.

* * * * *